(12) United States Patent
Chen et al.

(10) Patent No.: US 12,017,141 B2
(45) Date of Patent: Jun. 25, 2024

(54) VIRTUAL OBJECT CONTROL METHOD AND APPARATUS, DEVICE, AND STORAGE MEDIUM

(71) Applicant: Tencent Technology (Shenzhen) Company Limited, Shenzhen (CN)

(72) Inventors: Yu Chen, Shenzhen (CN); Le Wang, Shenzhen (CN); Jianmiao Weng, Shenzhen (CN); Xun Hu, Shenzhen (CN); Yulin Wan, Shenzhen (CN); Shandong Su, Shenzhen (CN); Yong Zhang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 329 days.

(21) Appl. No.: 17/512,492

(22) Filed: Oct. 27, 2021

(65) Prior Publication Data

US 2022/0047941 A1 Feb. 17, 2022

Related U.S. Application Data

(63) Continuation of application No. PCT/CN2021/078458, filed on Mar. 1, 2021.

(30) Foreign Application Priority Data

Apr. 15, 2020 (CN) .......................... 202010297051.0

(51) Int. Cl.
*A63F 13/426* (2014.01)
*A63F 13/2145* (2014.01)
(Continued)

(52) U.S. Cl.
CPC ........ *A63F 13/426* (2014.09); *A63F 13/2145* (2014.09); *A63F 13/56* (2014.09); *A63F 13/57* (2014.09)

(58) Field of Classification Search
CPC .. A63F 13/422; A63F 13/426; A63F 13/2145; A63F 13/56; A63F 13/57
See application file for complete search history.

(56) References Cited

U.S. PATENT DOCUMENTS 9,004,997 B1 4/2015 Prosin et al.
10,702,775 B2 * 7/2020 Rong .................... G06F 3/0481
(Continued)

FOREIGN PATENT DOCUMENTS

CN 107122119 A 9/2017
CN 107398071 A 11/2017
(Continued)

OTHER PUBLICATIONS

Tencent Technology, Vietnamese Office Action, VN Patent Application No. 1-2021-06498, dated Jul. 25, 2023, 4 pgs.
(Continued)

*Primary Examiner* — Steve Rowland
(74) *Attorney, Agent, or Firm* — Morgan, Lewis & Bockius LLP

(57) ABSTRACT

This application provides a virtual object control method performed by a computer device. The method includes: displaying a virtual battle interface; obtaining a first operation signal corresponding to a function triggering control; and receiving a first trigger operation on the function triggering control, and determining a first virtual object in n virtual objects as an attack target based on operation information of the first trigger operation when the first trigger operation meets an activation condition. According to the technical solutions provided in the embodiments of this application, an attack target is directly determined by using a target aiming function of a function triggering control and
(Continued)

attribute information of an operation signal, thereby providing the attack target with directivity and stability for different virtual scenes.

20 Claims, 9 Drawing Sheets

(51) Int. Cl.
*A63F 13/56* (2014.01)
*A63F 13/57* (2014.01)

(56) References Cited

U.S. PATENT DOCUMENTS

| | | | | |
|---|---|---|---|---|
| 2002/0103031 | A1* | 8/2002 | Neveu | A63F 13/537 463/49 |
| 2004/0157662 | A1* | 8/2004 | Tsuchiya | A63F 13/5378 463/32 |
| 2006/0287027 | A1* | 12/2006 | Hardisty | A63F 13/45 463/8 |
| 2007/0270215 | A1* | 11/2007 | Miyamoto | A63F 13/45 463/32 |
| 2008/0214304 | A1* | 9/2008 | Castle | A63F 13/10 463/36 |
| 2009/0181736 | A1* | 7/2009 | Haigh-Hutchinson | A63F 13/55 463/2 |
| 2009/0325660 | A1* | 12/2009 | Langridge | A63F 13/45 463/2 |
| 2010/0009733 | A1 | 1/2010 | Garvin et al. | |
| 2010/0311503 | A1* | 12/2010 | McMain | A63F 13/58 463/40 |
| 2012/0322523 | A1* | 12/2012 | Woodard | A63F 13/69 463/2 |
| 2013/0196767 | A1* | 8/2013 | Garvin | A63F 13/422 463/36 |
| 2015/0157932 | A1* | 6/2015 | Kwon | G06Q 50/00 463/31 |
| 2015/0157940 | A1* | 6/2015 | Hall | A63F 13/5372 463/31 |
| 2015/0258439 | A1* | 9/2015 | Prosin | A63F 13/00 463/31 |
| 2015/0273331 | A1* | 10/2015 | McMain | A63F 13/45 463/31 |
| 2016/0129345 | A1* | 5/2016 | Seok | A63F 13/213 463/31 |
| 2017/0361230 | A1* | 12/2017 | Tang | A63F 13/422 |
| 2018/0043260 | A1 | 2/2018 | Tang et al. | |
| 2018/0147488 | A1* | 5/2018 | Tang | A63F 13/426 |
| 2018/0369693 | A1* | 12/2018 | Rong | A63F 13/92 |
| 2019/0391676 | A1* | 12/2019 | Wang | G06F 3/04886 |
| 2020/0368616 | A1* | 11/2020 | Delamont | H04N 13/239 |
| 2022/0047941 | A1* | 2/2022 | Chen | A63F 13/837 |

FOREIGN PATENT DOCUMENTS

| | | |
|---|---|---|
| CN | 107823884 A | 3/2018 |
| CN | 108536374 A | 9/2018 |
| CN | 109224439 A | 1/2019 |
| CN | 109331468 A | 2/2019 |
| CN | 110064193 A | 7/2019 |
| CN | 110193195 A | 9/2019 |
| CN | 110420462 A | 11/2019 |
| CN | 110652725 A | 1/2020 |
| CN | 111481932 A | 8/2020 |
| EP | 3264248 A1 | 1/2018 |
| EP | 3939681 A1 | 1/2022 |
| JP | 2018075225 A | 5/2018 |
| JP | 2018517449 A | 7/2018 |
| JP | 2019146699 A | 9/2019 |
| KR | 20180005222 A | 1/2018 |
| KR | 20180012790 A | 2/2018 |
| KR | 20190131673 A | 11/2019 |
| WO | WO 2015151640 A1 | 10/2015 |
| WO | WO 2021208614 A1 | 10/2021 |

OTHER PUBLICATIONS

"King of Glory Nezha's Big Move Skills", Feb. 18, 2017, 4 pgs., Retrieved from the Internet: https://jingyan.baidu.com/article/6b1823099b0d8fba58e1592a.html.
Tencent Technology, ISR, PCT/CN2021/078458, Jun. 1, 2021, 2 pgs.
"Saint Seiya Tencent Mobile Game Combat System Strategy, Cute Newcomers Look Over", Jul. 27, 2018, 3 pgs., Retrieved from the Internet: https://m.18183.com/sdsxssy/201807/1139005.html.
"What is the Difference Between the King of Glory Skill Release Avatar Lock and Roulette Lock? After Reading this Post, I Will Know", Oct. 18, 2018, 9 pgs., Retrieved from the Internet: https://www.sobu.com/a/297237583_120099889.
Tencent Technology, IPRP, PCT/CN2021/078458, Oct. 13, 2022, 5 pgs.
Tencent Technology, JP Office Action, Japanese Patent Application No. 2021-564607, dated Dec. 5, 2022, 9 pgs.
Tencent Technology, Canadian Office Action, CA Application No. 3,133,915, dated Oct. 12, 2023, 5 pgs.
Tencent Technology, Singapore Office Action, SG Patent Application No. 11202111571R, dated Mar. 21, 2023, 9 pgs.
Tencent Technology, Canadian Office Action, CA Patent Application No. 3,133,915, dated Dec. 12, 2022, 5 pgs.
Tencent Technology, Korean Office Action, KR Patent Application No. 10-2021-7034293, dated Sep. 7, 2023, 33 pgs.
Tencent Technology, AU Office Action, AU Patent Application No. 2021250929, dated Oct. 12, 2022, 3 pgs.
Tencent Technology, WO, PCT/CN2021/078458, Jul. 26, 2022, 4 pgs.
Extended European Search Report, EP21782865.6, dated May 30, 2022, 13 pgs.

* cited by examiner

VIRTUAL OBJECT CONTROL METHOD AND APPARATUS, DEVICE, AND STORAGE MEDIUM

CROSS-REFERENCE TO RELATED APPLICATIONS

This application is a continuation application of PCT Patent Application No. PCT/CN2021/078458, entitled "VIRTUAL OBJECT CONTROL METHOD AND APPARATUS, DEVICE, AND STORAGE MEDIUM" filed on Mar. 1, 2021, which claims priority to Chinese Patent Application No. 202010297051.0, filed with the State Intellectual Property Office of the People's Republic of China on Apr. 15, 2020, and entitled "VIRTUAL OBJECT CONTROL METHOD AND APPARATUS, DEVICE, AND STORAGE MEDIUM", all of which are incorporated herein by reference in their entirety.

FIELD OF THE TECHNOLOGY

Embodiments of this application relate to the field of computer technologies, and in particular, to a virtual object control method and apparatus, a device, and a storage medium.

BACKGROUND OF THE DISCLOSURE

A battle game is a game in which a plurality of user accounts compete in the same scene. For example, the battle game may be a multiplayer online battle arena (MOBA) game.

In the related art, during a game battle, a target virtual object is searched for in real time according to a preset enemy selection rule and used as an attack target. Each time a target virtual object is determined in real time according to a virtual scene at the current time point, and target virtual objects determined in different virtual scenes may be different. As such, a target selection result according to the related art does not have directivity and stability.

SUMMARY

Embodiments of this application provide a virtual object control method and apparatus, a device, and a storage medium, to provide a target selection result with directivity and stability. The technical solutions are as follows:

According to an aspect, an embodiment of this application provides a virtual object control method performed by a computer device, the method including:

displaying a virtual battle interface, the virtual battle interface including n virtual objects and a function triggering control, the function triggering control being configured to trigger an attack function against one of the virtual objects, n being a positive integer;

receiving a first trigger operation on the function triggering control; and determining a first virtual object in the n virtual objects as an attack target based on operation information of the first trigger operation when the first trigger operation meets an activation condition, the operation information being information obtained based on an activated target aiming function associated with the function triggering control, the target aiming function being used for selecting an attack virtual target for the attack function.

According to another aspect, an embodiment of this application provides a computer device, including a processor and a memory, the memory storing at least one program, the at least one program being loaded and executed by the processor to implement the virtual object control method described in the foregoing aspect.

The computer device includes a terminal and a server.

According to another aspect, an embodiment of this application provides a non-transitory computer-readable storage medium, storing at least one program, the at least one program being loaded and executed by a processor of a computer device to implement the virtual object control method described in the foregoing aspect.

The technical solutions provided in the embodiments of this application may include the following beneficial effects:

A virtual object used as an attack target is determined from a plurality of virtual objects by activating a target aiming function of a function triggering control and according to attribute information of an operation signal associated with the function triggering control. Compared with the related art in which each time a target virtual object is determined in real time according to a virtual scene at the current time point, and target virtual objects determined in different virtual scenes may be different, according to the technical solutions provided in the embodiments of this application, the attack target is directly determined by using the target aiming function of the function triggering control and the attribute information of the operation signal, so that the determined attack target can be kept unchanged for different virtual scenes, thereby providing the attack target with directivity and stability.

BRIEF DESCRIPTION OF THE DRAWINGS

To describe the technical solutions in embodiments of this application more clearly, the following briefly describes the accompanying drawings required for describing the embodiments. Apparently, the accompanying drawings in the following description show merely some embodiments of this application, and a person of ordinary skill in the art may still derive other accompanying drawings from these accompanying drawings without creative efforts.

DESCRIPTION OF EMBODIMENTS

Figure 1:
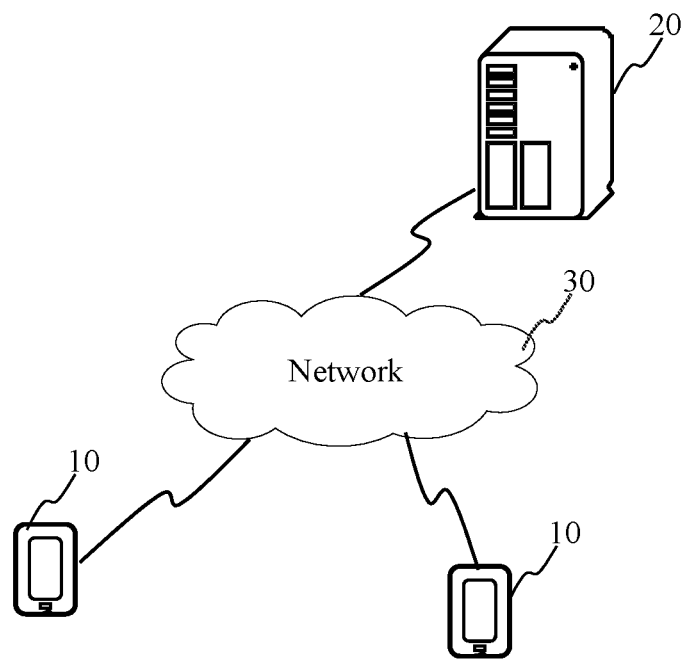
FIG. 1 is a schematic diagram of an implementation environment according to an embodiment of this application.

To make objectives, technical solutions, and advantages of this application clearer, the following further describes implementations of this application in detail with reference to the accompanying drawings.

First, terms involved in the embodiments of this application are briefly introduced as follows:

1. Virtual Scene

A virtual scene may also be referred to as a virtual environment, and is a scene displayed (or provided) when a client of an application (such as a game application) runs on a terminal. The virtual scene refers to a scene created for a virtual object to perform activities (such as game competition). The virtual scene may be, for example, a virtual house, a virtual island, or a virtual map. The virtual scene may be a simulated scene of the real world, or may be a semi-simulated semi-fictional scene, or may be an entirely fictional scene. The virtual scene may be a two-dimensional virtual scene, a 2.5-dimensional virtual scene, or a three-dimensional virtual scene. This is not limited in the embodiments of this application.

2. Virtual Object

A virtual object is a virtual character controlled by a user account in an application. For example, the application is a game application. The virtual object is a game character controlled by the user account in the game application. The virtual object may be in a human form or animal, cartoon, or other forms. This is not limited in the embodiments of this application. The virtual object may be presented in a three-dimensional form or a two-dimensional form. This is not limited in the embodiments of this application.

In different game applications, operations that can be performed by the virtual object controlled by the user account may be different. For example, in a shooting game application, the user account may control the virtual object to perform operations such as shooting, running, jumping, gun picking up, gun replacing, and bullet loading.

Certainly, in addition to the game applications, the virtual object may also be presented to a user and provided with a corresponding function in applications of another type, for example, an augmented reality (AR) application, a social application, or an interactive entertainment application. This is not limited in the embodiments of this application. Besides, the form and corresponding function of the virtual object vary with different applications, and may be preset according to an actual requirement. This is not limited in the embodiments of this application.

3. Ordinary Attack

An attack is a case in which a virtual object in a virtual environment triggers a function of another virtual object to cause attribute values of the another virtual object to change. For example, attribute values of virtual objects include hit points, and an attack is a case in which after a virtual object triggers a function of another virtual object, resulting a decrease in hit points of the virtual object whose function is triggered. An ordinary attack is an attack manner carried by virtual objects by default in a virtual scene. That is, the ordinary attack does not need to be triggered through skill configuration, and no additional attributes such as an energy value and a mana value need to be consumed during the triggering. In some embodiments, the ordinary attack does not have a cooldown time, and can be continuously triggered. In some embodiments, a virtual object can also trigger a skill attack in a virtual scene, and an attack impact produced by the skill attack is greater than that produced by the ordinary attack.

FIG. 1 is a schematic diagram of an implementation environment according to an embodiment of this application. The implementation environment may include a terminal 10 and a server 20.

The terminal 10 may be a mobile phone, a personal computer, a tablet computer, an e-book reader, a video game console, a Moving Picture Experts Group Audio Layer IV (MP4) player, or the like.

A client of a game application, for example, a client of a shooting game application, may be installed in the terminal 10. The shooting game application may be any one of a first-person shooting (FPS) game application, a third-person shooting (TPS) game application, a MOBA game application, a multiplayer gunfight survival game application, and the like. In some embodiments, the game application may be a standalone application, such as a standalone 3D game application, or may be a network online application.

The server 20 is configured to provide a backend service to a client of an application (for example, a game application) in the terminal 10. For example, the server 20 may be a backend server of the application (for example, the game application). The server 20 may be one server, a server cluster including a plurality of servers, or a cloud computing service center.

The terminal 10 may communicate with the server 20 through a network 30. The network 30 may be a wired network or a wireless network.

Figure 2:
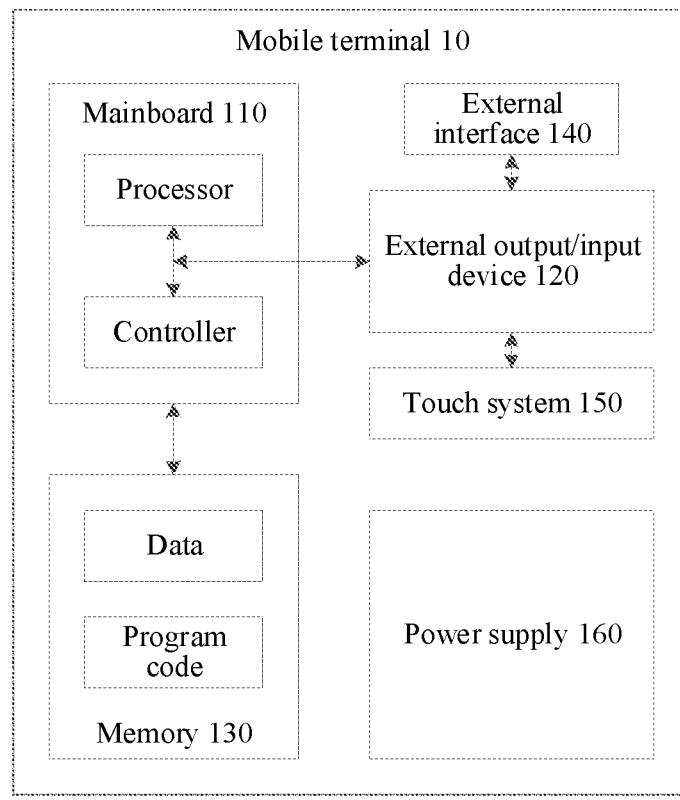
FIG. 2 is a schematic structural diagram of a terminal according to an embodiment of this application.

In the method embodiments of this application, an execution entity of each step may be a terminal. FIG. 2 is a schematic structural diagram of a terminal according to an embodiment of this application. The terminal 10 may include a mainboard 110, an external output/input device 120, a memory 130, an external interface 140, a touch system 150, and a power supply 160.

Processing elements such as a processor and a controller are integrated in the mainboard 110.

The external output/input device 120 may include a display component (for example, a display screen), a sound playback component (for example, a speaker), a sound collecting component (for example, a microphone), and various buttons.

The memory 130 stores program code and data.

The external interface 140 may include an earphone interface, a charging interface, a data interface, and the like.

The touch system 150 may be integrated in the display component or the buttons of the external output/input device 120, and the touch system 150 is configured to detect touch operations performed by a user on the display component or the buttons.

The power supply 160 is configured to supply power to other components in the terminal 10.

In the embodiments of this application, the processor in the mainboard 110 may generate a user interface (UI) (for example, a game interface) by executing or invoking the program code and data stored in the memory, and present the generated UI (for example, the game interface) by using the external output/input device 120. During presentation of the UI (for example, the game interface), a touch operation performed during interaction between the user and the UI (for example, the game interface) may be detected by using the touch system 150, and a response is made to the touch operation.

The technical solutions of this application are described below by using several embodiments.

Figure 3:
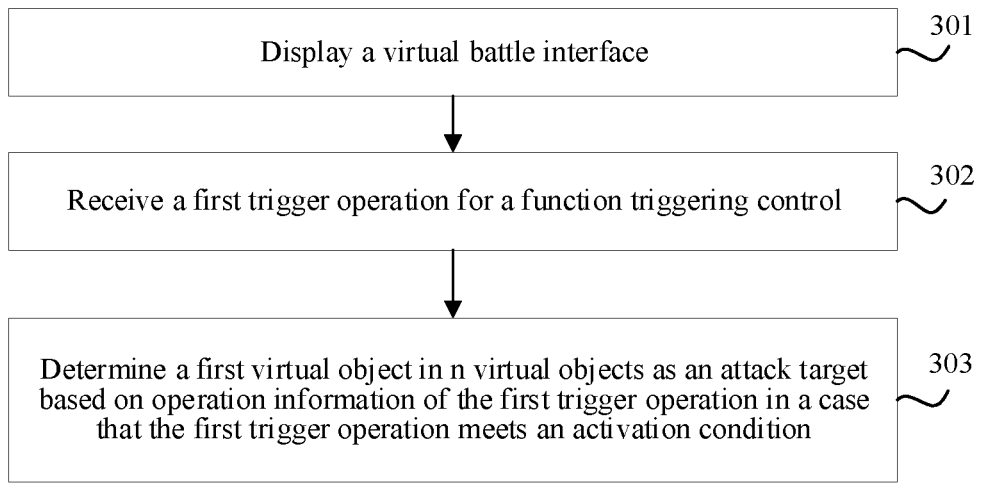
FIG. 3 is a flowchart of a virtual object control method according to an embodiment of this application.

FIG. 3 is a flowchart of a virtual object control method according to an embodiment of this application. An example in which the method is applied to the terminal shown in FIG. 1 is used for description. For example, the method is applied to a game application installed and running on the terminal. The method includes the following steps:

Step 301: Display a virtual battle interface.

In some embodiments, a user runs the game application installed in the terminal. The virtual battle interface is displayed in the game application. The virtual battle interface is configured to display an interaction game environment provided by the game for the user to control a virtual object. That is, the virtual battle interface is a game battle interface displayed in the game application.

The virtual battle interface includes a virtual environment picture obtained by observing a virtual environment and a control layer on the virtual environment picture. The virtual environment picture includes n virtual objects in a game scene, n being a positive integer. The control layer includes a function triggering control. In some embodiments, the function triggering control is configured to trigger an ordinary attack against a virtual object. The function triggering control is configured to trigger an ordinary attack of a main controlled virtual object against another virtual object. The main controlled virtual object is a virtual object controlled by the current terminal.

In some embodiments, the virtual environment picture further includes other elements in the virtual environment, such as a virtual building, a virtual prop, and a virtual item. The control layer further includes other operation controls such as a joystick control and a skill casting control. The joystick control is an operation control configured to control the main controlled virtual object to move. The skill casting control is an operation control configured to control the main controlled virtual object to cast a skill. There may be a plurality of skill casting controls.

In some embodiments, the n virtual objects are divided into different teams (or camps, groups, or the like). Virtual objects belonging to different teams are hostile to each other. Conversely, virtual objects belonging to the same team are teammates to each other. For example, 10 users participate the same game battle, and the 10 users may form a plurality of different teams. For example, each team may include five users. For a team, virtual objects controlled by five users in the team are hostile to virtual objects controlled by users in the other team. Conversely, the virtual objects controlled by the five users in the team are teammates to each other.

Step 302: Receive a first trigger operation on the function triggering control.

In some embodiments, the user operates the function triggering control in the virtual battle interface. Correspondingly, the game application obtains an operation signal corresponding to the function triggering control.

In some embodiments, the first trigger operation includes at least one of a single-click/tap operation, double-click/tap operation, a press operation, a drag operation, a slide operation, and the like. This is not limited in this embodiment of this application.

Step 303: Determine a first virtual object in the n virtual objects as an attack target based on operation information of the first trigger operation when the first trigger operation meets an activation condition.

In some embodiments, when the first trigger operation is received, a target aiming function is activated when the first trigger operation meets the activation condition. That is, the operation information is information obtained based on the activated target aiming function. The target aiming function is used for selecting an attack target for an ordinary attack. Aiming is a process of providing an attack with directivity during the attack in the virtual environment. The aiming may be performed for a virtual object in the virtual environment, that is, the main controlled virtual object specifies a direction or an object before an attack. Alternatively, the aiming may be performed for a virtual item in the virtual environment, that is, the main controlled virtual object specifies a virtual item to be attacked. A target for the attack is not limited in this embodiment of this application. In this embodiment of this application, the target aiming function is used for specifying an object before an attack, that is, clearly specifying a virtual object to which the attack points. The target aiming function may target one or at least two virtual objects. This is not limited in this embodiment of this application.

In some embodiments, the function triggering control includes an activation region and an aiming region. When a touch operation of the user on the function triggering control is within the activation region, the function triggering control can be activated for use; and when the touch operation of the user on the function triggering control is outside the activation region and within the aiming region, the target aiming function of the function triggering control can be used. That is, the first virtual object is determined as the attack target based on the operation information of the first trigger operation when an operation position of the first trigger operation is moved from the activation region to the aiming region.

In some embodiments, the activation region and the aiming region are two concentric circles, and a diameter of a circle corresponding to the activation region is less than a diameter of a circle corresponding to the aiming region. That is, the activation region is an inner circle in the concentric circles, and the aiming region is an annular region of an outer circle corresponding to the concentric circles.

Figure 4:
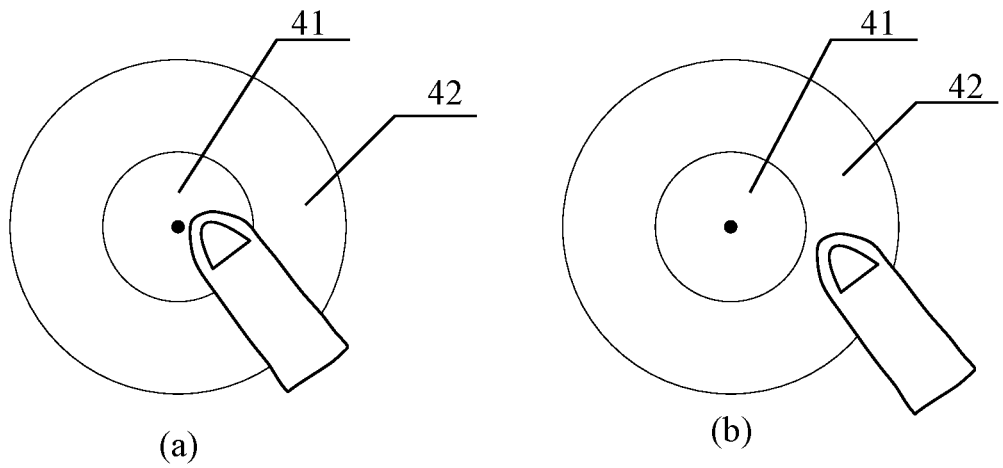
FIG. 4 is an exemplary schematic diagram of a function triggering control according to this application.

For example, FIG. 4 is an exemplary schematic diagram of a function triggering control. The function triggering control may include an activation region 41 and an aiming region 42. As shown in a part (a) in FIG. 4, when the user touches the activation region with a finger, the function triggering control may be activated for use. As shown in a part (b) in FIG. 4, when the user touches a position outside the activation region 41 and within the aiming region 42 with a finger, the target aiming function of the function triggering control can be used.

In this case, that the target aiming function is activated when a first operation signal meets the condition may include: activating the target aiming function of the function triggering control when the first operation signal is moved from the activation region to the aiming region. In other words, when the finger of the user slides from the activation region to the aiming region, the target aiming function is activated.

After the target aiming function of the function triggering control is activated, the first virtual object is determined from the n virtual objects as an attack target for an ordinary attack according to operation information of the first trigger operation. The operation information of the first trigger operation is used for indicating related information corresponding to the first trigger operation, for example, direction information of the first trigger operation.

The first virtual object is a virtual object hostile to a main controlled virtual object controlled by a target user account.

In a possible implementation, the determining a first virtual object in the n virtual objects as an attack target based on operation information of the first trigger operation may include the following steps:

(1) displaying a target selection region in the virtual battle interface based on the direction information of the first trigger operation; and
(2) determining the first virtual object within the target selection region as the attack target when the first trigger operation ends.

The direction information is a direction of a real-time touch point of the first operation signal relative to a center point of the function triggering control. The real-time touch point is a touch point of the user on the virtual battle interface in real time. After obtaining the direction information of the first trigger operation, a client may determine the target selection region according to the direction of the real-time touch point relative to the center point of the function triggering control that is indicated by the direction information, and display the target selection region in the virtual battle interface. The target selection region is a region used for selecting an attack target.

Subsequently, when it is detected that the first trigger operation ends, that is, the finger of the user leaves a screen of the terminal, the client directly determines the first virtual object in the target selection region as the attack target.

Figure 5:
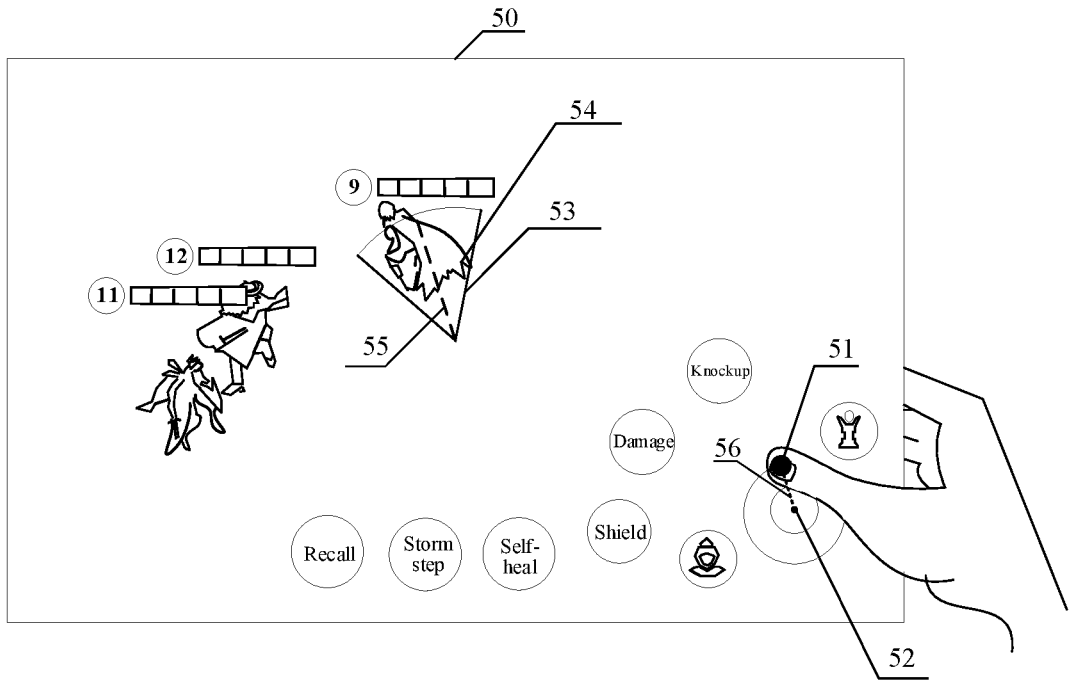
FIG. 5 is an exemplary schematic diagram of a virtual battle interface according to this application.

For example, FIG. 5 is an exemplary schematic diagram of a virtual battle interface. In the virtual battle interface 50, the direction information of the first trigger operation is a direction of the real-time touch point 51 of the first trigger operation relative to the center point 52 of the function triggering control. The target selection region 53 may be displayed in the virtual battle interface 50 according to the direction information. Subsequently, the finger of the user leaves the screen of the terminal, and the clients detects that the first trigger operation ends, and determines the first virtual object 54 in the target selection region 53 as the attack target.

In another possible implementation, the determining a first virtual object in the n virtual objects as an attack target based on operation information of the first trigger operation includes: determining an operation type of the first trigger operation; and determining the first virtual object in the n virtual objects as the attack target according to the operation type.

The operation type may include a single-click/tap operation, double-click/tap operation, a press operation, a drag operation, a slide operation, and the like. Different types of operations correspond to different manners of determining an attack target. For example, when the operation type is a double-click/tap operation, a virtual object closest to a target virtual object is selected and determined as an attack target; and when the operation type is a press operation, a virtual object having lowest hit points is selected and determined as an attack target.

In still another possible implementation, the determining a first virtual object in the n virtual objects as an attack target based on operation information of the first trigger operation may include: determining a quantity of operation times of the first trigger operation; and determining the first virtual object in the n virtual objects as the attack target according to the quantity of operation times.

The quantity of operation times is a quantity of operation combos corresponding to the first trigger operation. When a quantity of the combos is different, a virtual object selected as an attack target is also different. For example, when a quantity of the combos is two, a virtual object closest to the target virtual object is selected and determined as an attack target; and when a quantity of the combos is three, a virtual object relatively close to the target virtual object is selected and determined as an attack target.

In still another possible implementation, the determining a first virtual object in the n virtual objects as an attack target based on operation information of the first trigger operation may include: determining press information of the first trigger operation; and determining the first virtual object in the n virtual objects as the attack target according to the press information.

The press information may include a pressing pressure value. When the pressure value is in a different pressure range, a virtual object selected as an attack target is also different. For example, when the pressure value is in a first pressure range, a virtual object closest to the target virtual object is selected and determined as an attack target; and when the pressure value is in a second pressure range, a virtual object relatively close to the target virtual object is selected and determined as an attack target.

In still another possible implementation, the determining a first virtual object in the n virtual objects as an attack target based on operation information of the first trigger operation may include: determining duration information of the first trigger operation; and determining the first virtual object in the n virtual objects as the attack target according to the duration information.

The duration information is an operation press duration corresponding to the first trigger operation. When the press duration is different, a virtual object selected as an attack target is also different. For example, when the press duration is longer than 0 and shorter than a first duration, a virtual object closest to the target virtual object is selected and determined as an attack target; and when the press duration is longer than the first duration and shorter than a second duration, a virtual object relatively close to the target virtual object is selected and determined as an attack target.

In some other possible implementations, the determining a first virtual object in the n virtual objects as an attack target based on operation information of the first trigger operation may be in another manner. This is not limited in this embodiment of this application.

In some embodiments, when the target selection region includes a plurality of virtual objects, the client may determine all the plurality of virtual objects as attack targets, or may select one virtual object from the plurality of virtual objects and determine the virtual object as an attack target. When one virtual object is selected from the plurality of virtual objects and determined as an attack target, any one of the following selection manners may be used: determining a virtual object having lowest hit points in the plurality of virtual objects is determined as an attack target, and a virtual object closest to the target virtual object in the plurality of virtual objects is determined as an attack target. The target virtual object is a virtual object corresponding to the target user account, a virtual object is randomly selected from the plurality of virtual objects as an attack target, and the like. The selection manner is not limited in this embodiment of this application.

For example, the target selection region is an arc-shaped region with a position of a target virtual object as a vertex, and a center line direction of the target selection region corresponds to the direction information.

The target virtual object is a virtual object corresponding to (controlled by) a target user account. The target user account may be a user account logged in to in the client.

In this case, the target selection region may be arc-shaped, and takes a position of the target virtual object as a vertex. A center line direction of the arc shape corresponds to the direction information, that is, the direction of the real-time touch point of the first trigger operation relative to the center point of the function triggering control.

The arc shape may be a fan shape, fan ring, or the like. In some other examples, the target selection region may alternatively be sword-shaped or other shapes. This is not limited in this embodiment of this application.

For example, as shown in FIG. 5, the target selection region 53 is fan-shaped, and a center line direction 55 of the target selection region corresponds to the direction information 56.

In another example, a relative direction between a center point of the target selection region and the position of the target virtual object corresponds to the direction information, and a distance between the center point of the target selection region and the position of the target virtual object corresponds to a distance between the real-time touch point and the center point of the function triggering control.

In this case, the target selection region may be a closed pattern, such as a circle or a polygon. The relative direction between the center point of the target selection region and the position of the target virtual object corresponds to the direction information, that is, the direction of the real-time touch point of the first trigger operation relative to the center point of the function triggering control. In addition, a distance between the center point of the target selection region and the position of the target virtual object corresponds to a distance between the real-time touch point and the center point of the function triggering control. For example, a ratio of the distance between the center point of the target selection region and the position of the target virtual object to the distance between the real-time touch point and the center point of the function triggering control is a fixed value.

After the distance between the real-time touch point and the center point of the function triggering control is greater than a specified distance, the distance between the center point of the target selection region and the position of the target virtual object no longer varies with the distance between the real-time touch point and the center point of the function triggering control.

Based on the above, according to the technical solution provided in this embodiment of this application, a virtual object used as an attack target is determined from a plurality of virtual objects by activating a target aiming function of a function triggering control and according to attribute information of an operation signal. Compared with the related art in which each time a target virtual object is determined in real time according to a virtual scene at the current time point, and target virtual objects determined in different virtual scenes may be different, according to the technical solution provided in this embodiment of this application, the attack target is directly determined by using the target aiming function of the function triggering control and the attribute information of the operation signal, so that the determined attack target can be kept unchanged for different virtual scenes, thereby providing the attack target with directivity and stability.

Figure 6:
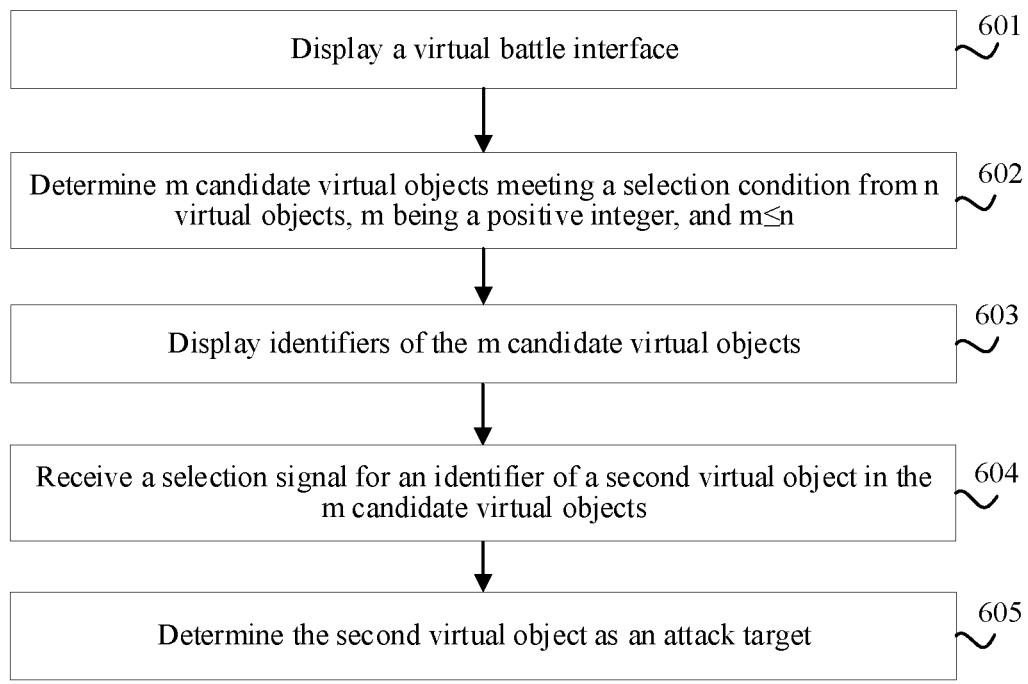
FIG. 6 is a flowchart of a virtual object control method according to another embodiment of this application.

FIG. 6 is a flowchart of a virtual object control method according to another embodiment of this application. An example in which the method is applied to the terminal shown in FIG. 1 is used for description. As shown in FIG. 6, the method includes the following steps:

Step 601: Display a virtual battle interface.

This step is the same as or similar to the content of step 301 in the foregoing embodiment of FIG. 3, and therefore details are not described herein again.

The virtual battle interface includes a virtual environment picture and a control layer on the virtual environment picture. The virtual environment picture includes n virtual objects in a game scene, n being a positive integer. The control layer includes a function triggering control. The function triggering control is configured to trigger an ordinary attack of a virtual object.

Step 602: Determine m candidate virtual objects meeting a selection condition from the n virtual objects, m being a positive integer, and m≤n.

A client detects virtual objects meeting the selection condition in the n virtual objects, and determines the virtual objects meeting the selection condition as candidate virtual objects.

The selection condition includes: a virtual object is alive, the virtual object is not in the virtual battle interface, and a distance between the virtual object and a target virtual object is greater than a preset distance, the target virtual object being a virtual object corresponding to a target user account.

In other words, when the virtual object is alive and enters a certain range near the target virtual object, and there is a field of view of the virtual object in the virtual battle interface, the virtual object may be determined as a candidate virtual object.

Step 603: Display identifiers of the m candidate virtual objects.

After the candidate virtual objects meeting the selection condition are determined, the identifiers of the candidate virtual objects are displayed in the virtual battle interface. The identifier of the candidate virtual object is used for uniquely identifying the virtual object.

For example, the identifier of the candidate virtual object may be an avatar of the candidate virtual object. In some other examples, the identifier of the candidate virtual object may be other information. This is not limited in this embodiment of this application.

Figure 7:
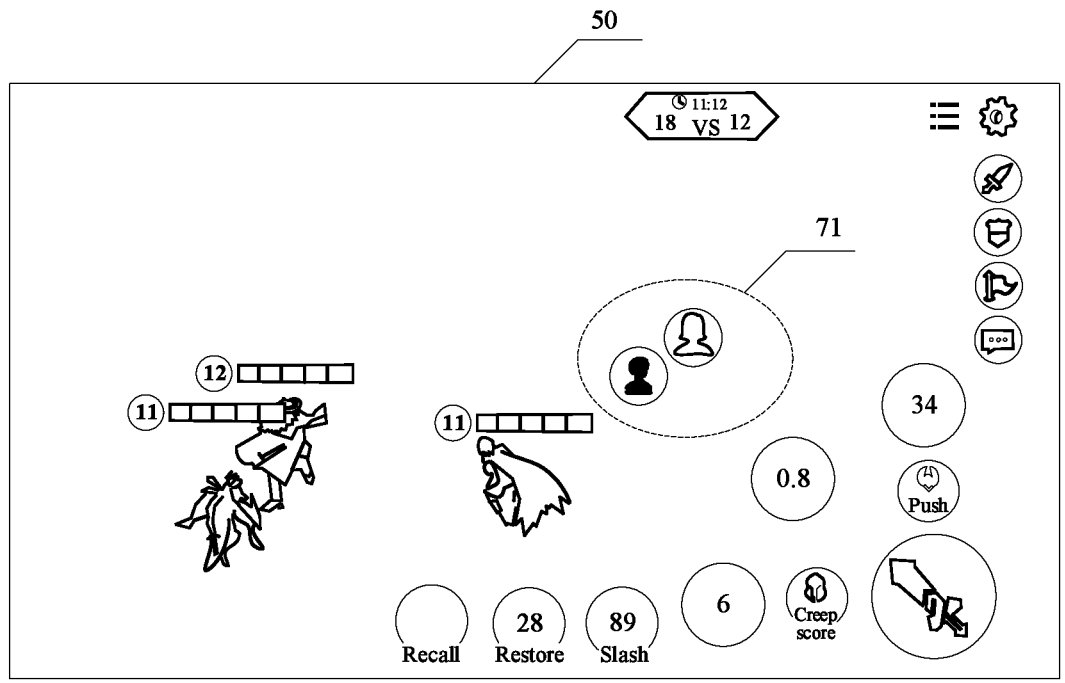
FIG. 7 is an exemplary schematic diagram of another virtual battle interface according to this application.

For example, FIG. 7 is an exemplary schematic diagram of another virtual battle interface. An avatar 71 of a candidate virtual object may be displayed in the virtual battle interface 50.

Step 604: Receive a selection signal for an identifier of a second virtual object in the m candidate virtual objects.

After the identifiers of the m candidate virtual objects are determined and displayed, a user may perform selection from the m candidate virtual objects. For example, the user may click an avatar of a candidate virtual object (the second virtual object) in the m candidate virtual objects, to trigger the selection signal.

Step 605: Determine the second virtual object as an attack target.

Correspondingly, after obtaining the selection signal corresponding to the second virtual object, the client directly determines the second virtual object as an attack target.

Based on the above, according to the technical solution provided in this embodiment of this application, after identifiers of candidate virtual objects are displayed, and a selection signal corresponding to an identifier of a virtual object in the candidate virtual objects is obtained, the virtual object is directly determined as an attack target. Compared with the related art in which a target virtual object is determined in real time according to a virtual scene at the current time point, and target virtual objects determined in different virtual scenes may be different, according to the technical solution provided in this embodiment of this application, the user directly selects the attack target in a virtual battle interface by selecting the identifier of the virtual object, thereby ensuring accuracy of attack selection.

In an embodiment provided based on the embodiment in FIG. 3, the foregoing virtual object control method may further include the following step:

after determining the first virtual object as an attack target, the client may further detect in real time whether the first virtual object meets a loss condition. The loss condition is a condition used for detecting whether an attack target is in a lost state.

The loss condition includes at least one of the following: the first virtual object being in a death state, the first virtual object being not in the virtual battle interface, and a distance between the first virtual object and the target virtual object being greater than a preset distance, the target virtual object being a virtual object corresponding to the target user account.

In other words, when it is detected that the first virtual object is dead, or there is no field of view of the first virtual object in the virtual battle interface, or the distance between the first virtual object and the target virtual object is greater than the preset distance, it is considered that the first virtual object meets the loss condition.

(1) It is determined that the first virtual object is in the lost state when the first virtual object meets the loss condition.

After it is detected that the first virtual object meets the loss condition, it is determined that the first virtual object is in the lost state.

(2) The first virtual object is kept as the attack target when no other virtual object is determined as the attack target within a target duration in which the first virtual object is in the lost state.

Within the target duration in which the first virtual object is in the lost state, the client may detect in real time whether the user determines another virtual object as a new attack target. When no other virtual object is determined as the attack target within the target duration, the first virtual object is kept as the attack target.

Based on the above, according to the technical solution provided in this embodiment, when a virtual object having been selected as an attack target is in a lost state, if the user does not redetermine an attack target within the target duration, the determined virtual object is kept as the attack target. Therefore, secondary operation costs required for the user to redetermine a determined attack target as a target in a short time after the determined attack target is lost can be reduced.

In another embodiment provided based on the embodiment in FIG. 3, after the determining a first virtual object in the n virtual objects as an attack target based on operation information of the first trigger operation in step 303, the following steps may further be performed: casting a skill to the attack target when a trigger operation corresponding to a skill casting control is received.

In other words, after the attack target is determined, the user may touch the skill casting control, to trigger and generate a trigger signal of the skill casting control. Correspondingly, when obtaining the trigger signal corresponding to the skill casting control, the client may cast a skill to the determined attack target.

In some embodiments, the casting a skill to the attack target when a trigger operation corresponding to a skill casting control is received may include the following steps:

(1) Obtain skill attribute information corresponding to the skill casting control when the trigger operation corresponding to the skill casting control is received.

When receiving the trigger operation corresponding to the skill casting control, the client may obtain the skill attribute information corresponding to the skill casting control, the skill attribute information being used for indicating a basic attribute of the skill.

The skill attribute information may include a skill casting rule. The skill casting rule is a condition that needs to be met for successful casting of the skill. For example, the skill casting rule may include a specified target type of the skill, an effective casting range of the skill, and the like. This is not limited in this embodiment of this application.

(2) Cast a skill to the attack target when the attack target meets the skill casting rule.

Subsequently, the client may detect whether the determined attack target meets the skill casting rule. When it is determined that the attack target meets the skill casting rule, the skill may be directly cast to the attack target.

In addition, a second virtual object in the n virtual objects that meets both a selection condition and the skill casting rule is determined as the attack target when the attack target does not meet the skill casting rule.

For example, assuming that the specified target type of the skill corresponding to the skill casting control is virtual objects, when the determined attack target is a virtual object, it is determined that the attack target meets the skill casting rule, and the skill may be cast to the attack target. Conversely, when the determined attack target is a building, it is determined that the attack target does not meet the skill casting rule, and the skill cannot be cast to the attack target. In this case, the client may reselect an attack target that meets both the selection condition and the skill casting rule.

Based on the above, according to the technical solution provided in this embodiment, when the user uses the skill casting control, if there is a determined attack target, the skill is preferentially cast to the attack target, thereby providing skill casting with directivity and stability.

In another embodiment provided based on the embodiment in FIG. 3, after the determining a first virtual object in the n virtual objects as an attack target based on operation information of the first trigger operation in step 303, the method further includes: receiving a deselection signal corresponding to the first virtual object; and canceling, based on the deselection signal, the determining of the first virtual object as the attack target.

In other words, after the first virtual object is determined as the attack target, the determining of the first virtual object as the attack target may further be canceled. After obtaining the deselection signal corresponding to the first virtual object, the client cancels the determining of the first virtual object as the attack target.

The receiving a deselection signal corresponding to the first virtual object includes the following three manners:

(1) Receive a trigger operation corresponding to an identifier of the first virtual object.

After the first virtual object is determined as the attack target, the user may further touch the identifier of the first virtual object, for example, an avatar of the first virtual object, displayed in the virtual battle interface. Correspondingly, the client may receive a trigger operation corresponding to the identifier of the first virtual object, to cancel the determining of the first virtual object as the attack target.

(2) Receive a trigger operation corresponding to a target cancellation control.

The target cancellation control is configured to cancel determining of a virtual object as an attack target. The target cancellation control mat be an operation control having only a function of canceling determining of an attack target, or may be an operation control having other functions in addition to the function of canceling determining of an attack target.

Figure 8:
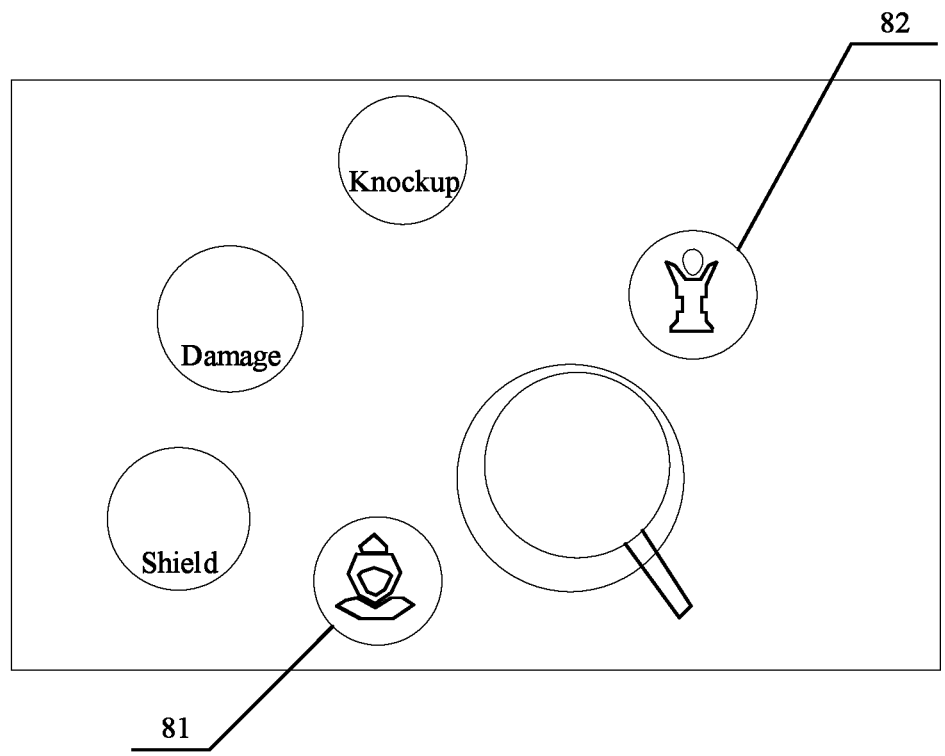
FIG. 8 is an exemplary schematic diagram of a target cancellation control according to this application.

For example, as shown in FIG. 8, the target cancellation control may be a soldier key 81 or a tower key 82.

(3) Receive a second trigger operation corresponding to the function triggering control.

The second trigger operation is an operation of sliding out of the function triggering control for a specified distance.

In other words, when a finger of the user slides out of the function triggering control for the specified distance, it is determined that the determining of the first virtual object as the attack target is to be canceled.

Based on the above, according to the technical solution provided in this embodiment of this application, after a virtual object used as an attack target is determined, the determining of the virtual object as the attack target can also be canceled, thereby improving the flexibility of attack target setting, and improving user experience.

In still another embodiment provided based on the embodiment in FIG. 3, after the determining a first virtual object in the n virtual objects as an attack target based on operation information of the first trigger operation in step 303, the method may further include: labeling and displaying the first virtual object in the virtual battle interface.

The labeling and displaying the first virtual object in the virtual battle interface may include the following two manners:

(1) Highlight an identifier of the first virtual object in the virtual battle interface.

The identifier of the first virtual object may be an avatar of the first virtual object, a hit point icon of the first virtual object, a model of the first virtual object, or the like.

In some embodiments, the highlighting an identifier of the first virtual object in the virtual battle interface includes, but not limited to, at least one of the following: adding a color label to the hit point icon of the first virtual object; and adding an identifier of a special shape (for example, a bracket) to the model of the first virtual object, and adding a color halo to the feet of the model of the first virtual object. In some other embodiments, the identifier of the first virtual object may alternatively be highlighted in other forms. This is not limited in this embodiment of this application.

Figure 9:
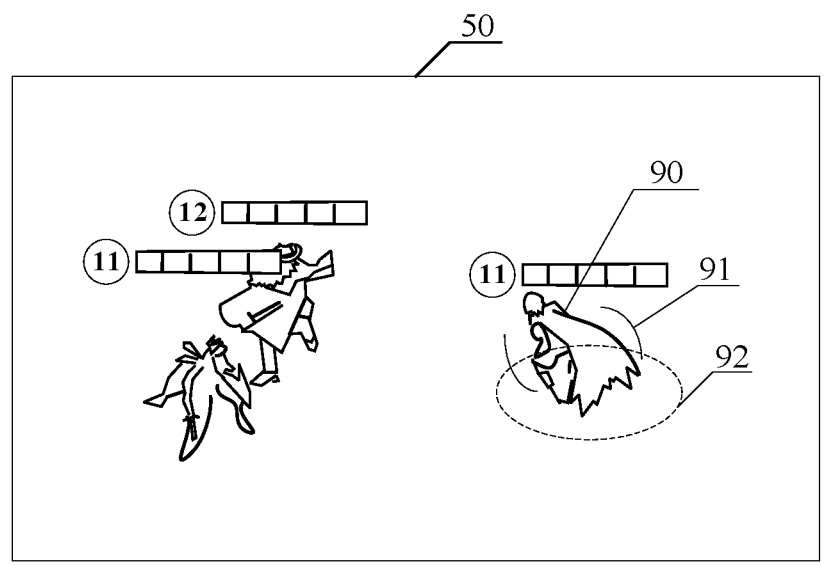
FIG. 9 is an exemplary schematic diagram of still another virtual battle interface according to this application.

For example, as shown in FIG. 9, in the virtual battle interface 50, a bracket 91 is displayed around a model of an attack target 90, and a color halo 92 is displayed at the feet of the model.

(2) Display, in the virtual battle interface, an association identifier used for indicating an association relationship between the identifier of the first virtual object and the first virtual object.

The association identifier is used for indicating the association relationship between the identifier of the first virtual object and the first virtual object, that is, a correspondence between the identifier of the first virtual object and the first virtual object.

For example, the association identifier may be a connection line connecting the identifier of the first virtual object and the first virtual object. In some other examples, the association identifier may alternatively be other identifiers used for connecting the identifier of the first virtual object and the first virtual object. This is not limited in this embodiment of this application.

Figure 10:
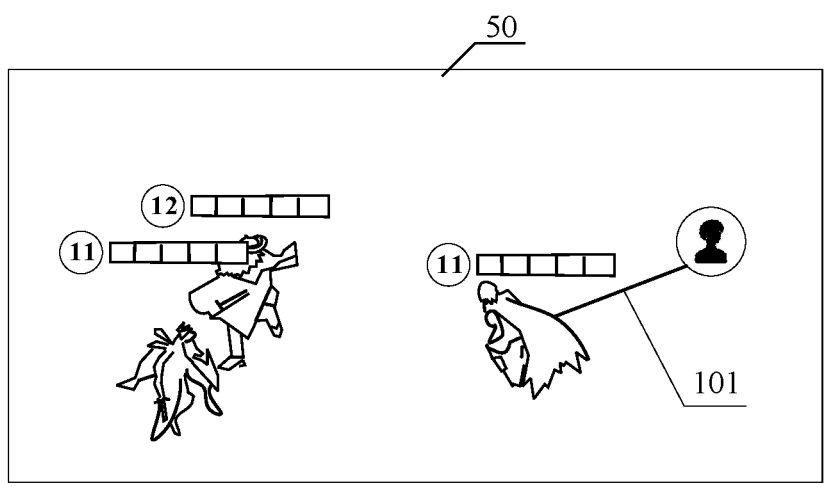
FIG. 10 is an exemplary schematic diagram of still another virtual battle interface according to this application.

For example, as shown in FIG. 10, a connection line 101 used for connecting an avatar of the first virtual object and the first virtual object may be displayed in the virtual battle interface 50.

Based on the above, according to the technical solution provided in this embodiment, after a virtual object is determined as an attack target, the virtual object may be labeled and displayed in a virtual battle interface, so that the user can be clearer about the virtual object determined as the attack target.

Figure 11:
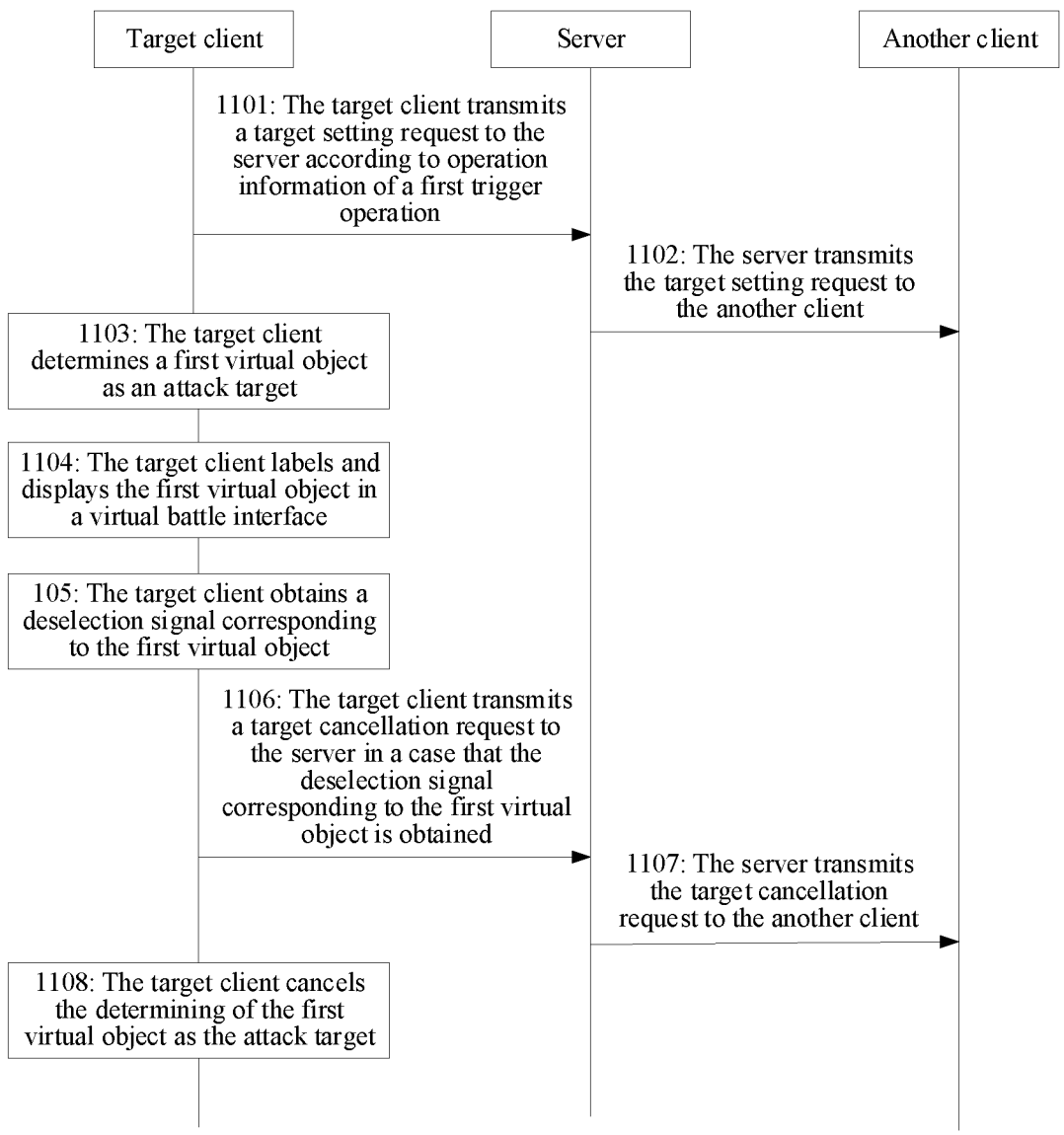
FIG. 11 is an exemplary flowchart of a virtual object control method according to an embodiment of this application.

FIG. 11 is an exemplary flowchart of a virtual object control method according to an embodiment of this application. In this embodiment, an example in which the method is applied to a client of a game application installed and running in a terminal and a server in the implementation environment shown in FIG. 1 is mainly used for description. The method may include the following steps.

Step 1101: A target client transmits a target setting request to a server according to operation information of a first trigger operation.

The target setting request is used for requesting to determine a first virtual object in n virtual objects as an attack target.

In some embodiments, the target setting request further includes identifier information of the first virtual object.

Correspondingly, the server receives the target setting request.

Step 1102: The server transmits the target setting request to another client.

The another client is a client corresponding to a virtual object participating in a game battle.

Step 1103: The target client determines the first virtual object as an attack target.

That is, the target client determines the first virtual object as an attack target for an ordinary attack.

Step 1104: The target client labels and displays the first virtual object in a virtual battle interface.

In some embodiments, the identifier of the first virtual object is highlighted, or an association identifier of the first virtual object is highlighted.

Step 1105: The target client obtains a deselection signal corresponding to the first virtual object.

In some embodiments, when the terminal receives the deselection signal of the first virtual object, the client obtains the deselection signal.

Step 1106: The target client transmits a target cancellation request to the server when the deselection signal corresponding to the first virtual object is obtained.

The target cancellation request is used for requesting to cancel the setting the first virtual object to the attack target.

Step 1107: The server transmits the target cancellation request to another client.

Step 1108: The target client cancels the determining of the first virtual object as the attack target.

Figure 12:
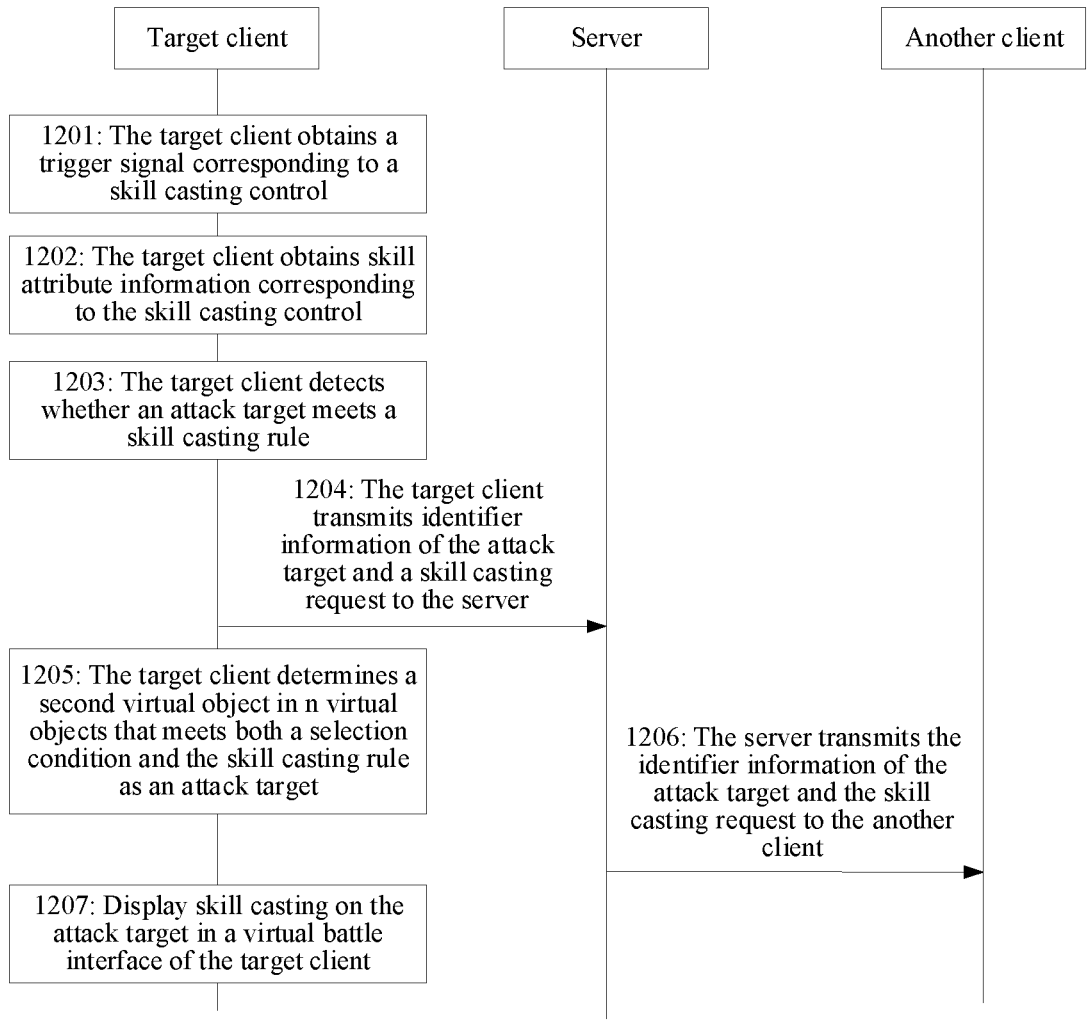
FIG. 12 is an exemplary flowchart of a virtual object control method according to another embodiment of this application.

FIG. 12 is an exemplary flowchart of a virtual object control method according to another embodiment of this application. In this embodiment, an example in which the method is applied to a client of a game application installed and running in a terminal and a server in the implementation environment shown in FIG. 1 is mainly used for description. The method may include the following steps:

Step 1201: A target client obtains a trigger signal corresponding to a skill casting control.

Step 1202: The target client obtains skill attribute information corresponding to the skill casting control.

The skill attribute information may include a skill casting rule.

Step 1203: The target client detects whether an attack target meets a skill casting rule.

When the attack target meets the skill casting rule, step 1204 is performed; and when the attack target does not meet the skill casting rule, step 1205 is performed.

Step 1204: The target client transmits identifier information of the attack target and a skill casting request to a server.

Step 1205: The target client determines a second virtual object in n virtual objects that meets both a selection condition and a skill casting rule as an attack target.

Step 1206: The server transmits the identifier information of the attack target and the skill casting request to another client.

Step 1207: Display skill casting on the attack target in a virtual battle interface of the target client.

The following describes apparatus embodiments of this application, which can be used to perform the method embodiments of this application. For details not disclosed in the apparatus embodiment of this application, reference may be made to the method embodiments of this application.

Figure 13:
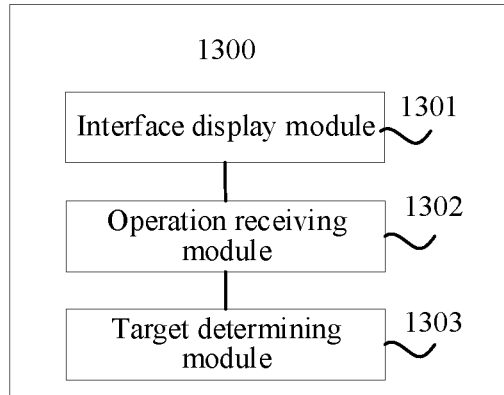
FIG. 13 is a block diagram of an attack target determining apparatus according to an embodiment of this application.

FIG. 13 is a block diagram of an attack target determining apparatus according to an embodiment of this application. The apparatus has a function of implementing the foregoing virtual object control method examples, and the function may be implemented by hardware or by hardware executing corresponding software. The apparatus may be the terminal described above, or may be disposed on the terminal. The apparatus 1300 may include: an interface display module 1301, an operation receiving module 1302, and a target determining module 1303.

The interface display module 1301 is configured to display a virtual battle interface, the virtual battle interface including n virtual objects and a function triggering control, the function triggering control being configured to trigger an attack function against one of the virtual objects, n being a positive integer.

The operation receiving module 1302 is configured to receive a first trigger operation on the function triggering control.

The target determining module 1303 is configured to determine a first virtual object in the n virtual objects as an attack target based on operation information of the first trigger operation when the first trigger operation meets an activation condition, the operation information being information obtained based on an activated target aiming function associated with the function triggering control, the target aiming function being used for selecting an attack target for the attack function.

Based on the above, according to the technical solution provided in this embodiment of this application, a virtual object used as an attack target is determined from a plurality of virtual objects by activating a target aiming function of a function triggering control and according to attribute information of an operation signal. Compared with the related art in which each time a target virtual object is determined in real time according to a virtual scene at the current time point, and target virtual objects determined in different virtual scenes may be different, according to the technical solution provided in this embodiment of this application, the attack target is directly determined by using the target aiming function of the function triggering control and the attribute information of the operation signal, so that the determined attack target can be kept unchanged for different virtual scenes, thereby providing the attack target with directivity and stability.

In some embodiments, the target determining module 1303 is configured to: display a target selection region in the virtual battle interface based on direction information of the first trigger operation, the direction information being a direction of a real-time touch point of the first trigger operation relative to a center point of the function triggering control; and determine the first virtual object within the target selection region as the attack target when the first trigger operation ends.

In some embodiments, the target selection region is an arc-shaped region with a position of a target virtual object as a vertex, and a center line direction of the target selection region corresponds to the direction information; or a relative direction between a center point of the target selection region and the position of the target virtual object corresponds to the direction information, and a distance between the center point of the target selection region and the position of the target virtual object corresponds to a distance between the real-time touch point and the center point of the function triggering control.

In some embodiments, the function triggering control includes an activation region and an aiming region; and the target determining module 1303 is configured to determine the first virtual object as the attack target based on the operation information of the first trigger operation when an operation position of the first trigger operation is moved from the activation region to the aiming region.

Figure 14:
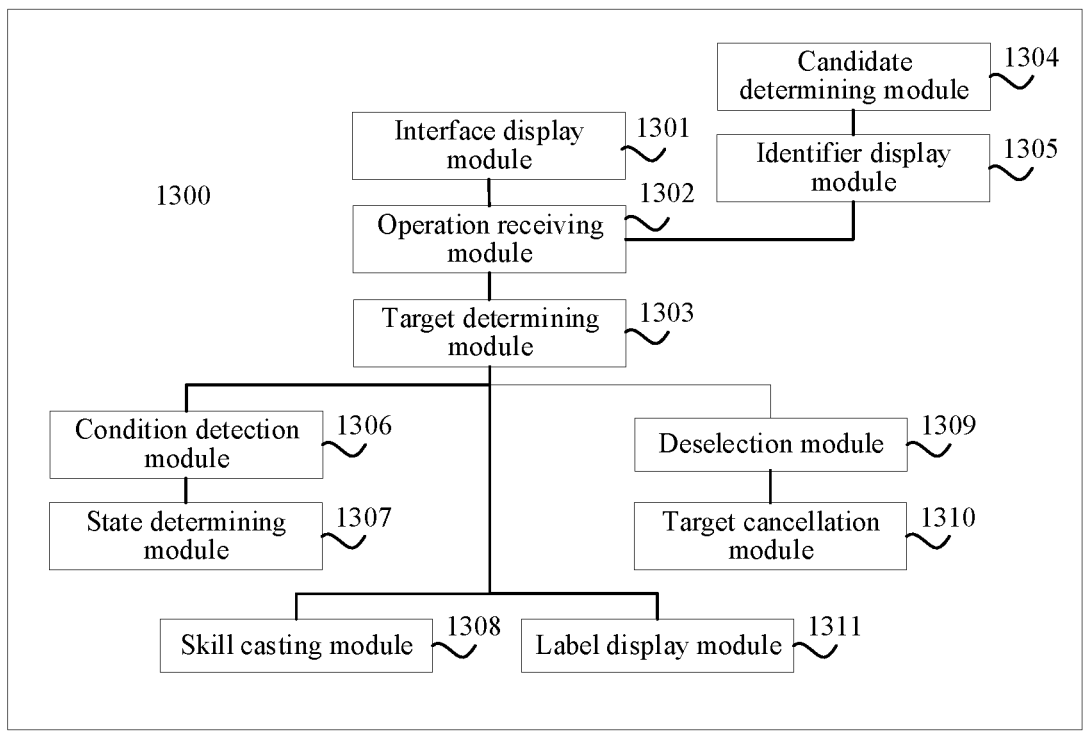
FIG. 14 is a block diagram of an attack target determining apparatus according to another embodiment of this application.

In some embodiments, as shown in FIG. 14, the apparatus 1300 further includes: a candidate determining module 1304 and an identifier display module 1305.

The candidate determining module 1304 is configured to determine m candidate virtual objects meeting a selection condition from the n virtual objects, m being a positive integer, and m≤n.

The identifier display module 1305 is configured to display identifiers of the m candidate virtual objects.

The operation receiving module 1302 is further configured to receive a selection signal for an identifier of a second virtual object in the m candidate virtual objects.

The target determining module 1303 is further configured to determine the second virtual object as the attack target.

In some embodiments, as shown in FIG. 14, the apparatus 1300 further includes: a condition detection module 1306 and a state determining module 1307.

The condition detection module 1306 is configured to detect whether the first virtual object meets a loss condition, the loss condition including at least one of the following: the first virtual object being in a death state, the first virtual object being not in the virtual battle interface, and a distance between the first virtual object and the target virtual object being greater than a preset distance.

The state determining module 1307 is configured to determine that the first virtual object is in the lost state when the first virtual object meets the loss condition.

The target determining module 1303 is further configured to keep the first virtual object as the attack target when no other virtual object is determined as the attack target within a target duration in which the first virtual object is in the lost state.

In some embodiments, as shown in FIG. 14, the apparatus 1300 further includes: a skill casting module 1308.

The skill casting module 1308 is configured to cast a skill to the attack target when a trigger operation corresponding to a skill casting control is received.

In some embodiments, the skill casting module 1308 is configured to: obtain skill attribute information corresponding to the skill casting control when the trigger operation corresponding to the skill casting control is received, the skill attribute information including a skill casting rule; and cast a skill to the attack target when the attack target meets the skill casting rule.

In some embodiments, the target determining module 1303 is further configured to determine, when the attack target does not meet the skill casting rule, a second virtual object in the n virtual objects that meets both a selection condition and the skill casting rule as the attack target.

In some embodiments, as shown in FIG. 14, the apparatus 1300 further includes: a deselection module 1309 and a target cancellation module 1310.

The deselection module 1309 is configured to receive a deselection signal corresponding to the first virtual object.

The target cancellation module 1310 is configured to cancel, based on the deselection signal, the determining of the first virtual object as the attack target.

In some embodiments, the deselection module 1309 is configured to: receive a trigger operation corresponding to an identifier of the first virtual object; or receive a trigger operation corresponding to a target cancellation control; or receive a second trigger operation corresponding to the function triggering control.

In some embodiments, as shown in FIG. 14, the apparatus 1300 further includes: a label display module 1311.

The label display module 1311 is configured to highlight an identifier of the first virtual object in the virtual battle interface; or the label display module 1311 is configured to display, in the virtual battle interface, an association identifier used for indicating an association relationship between the identifier of the first virtual object and the first virtual object.

When the apparatus provided in the foregoing embodiments implements functions of the apparatus, the division of the foregoing functional modules is merely an example for description. In the practical application, the functions may be assigned to and completed by different functional modules according to the requirements, that is, the internal structure of the device is divided into different functional modules, to implement all or some of the functions described above. In addition, the apparatus and method embodiments provided in the foregoing embodiments belong to the same concept. For the specific implementation process, reference may be made to the method embodiments, and details are not described herein again. In this application, the term "unit" or "module" refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit.

Figure 15:
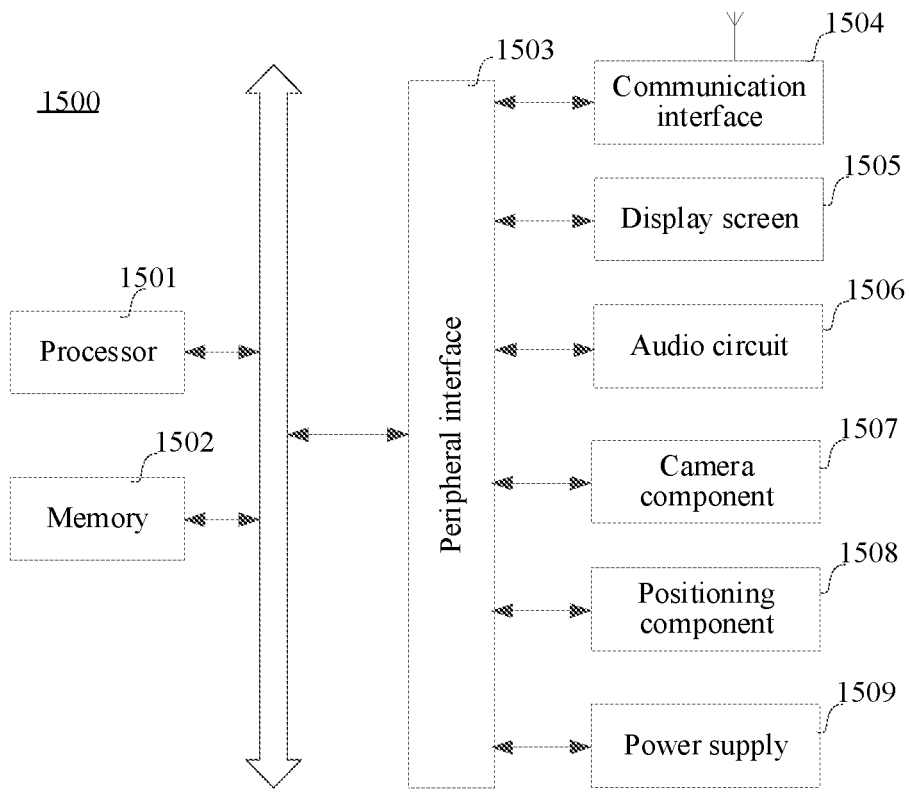
FIG. 15 is a structural block diagram of a terminal according to an embodiment of this application.

FIG. 15 is a structural block diagram of a terminal according to an embodiment of this application. Generally, a terminal 1500 includes a processor 1501 and a memory 1502.

The processor 1501 may include one or more processing cores, for example, a 4-core processor or an 8-core processor. The processor 1501 may be implemented by using at least one hardware form of a digital signal processor (DSP), a field programmable gate array (FPGA), and a programmable logic array (PLA). The processor 1501 may alternatively include a main processor and a coprocessor. The main processor is a processor configured to process data in an awake state, also referred to as a central processing unit (CPU), and the coprocessor is a low-power processor configured to process data in a standby state. In some embodiments, the processor 1501 may be integrated with a graphics processing unit (GPU). The GPU is configured to be responsible for rendering and drawing content that a display needs to display. In some embodiments, the processor 1501 may further include an artificial intelligence (AI) processor. The AI processor is configured to process a computing operation related to machine learning.

The memory 1502 may include one or more non-transitory computer-readable storage media. The computer-readable storage media may be non-transient. The memory 1502 may further include a high-speed random access memory (RAM), and a non-volatile memory such as one or more magnetic disk storage devices and a flash storage device. In some embodiments, the non-transitory computer-readable storage medium in the memory 1502 is configured to store at least one instruction, at least one program, a code set, or an instruction set, the at least one instruction, the at least one program, the code set, or the instruction set being configured to be executed by the processor 1501 to implement the virtual object control method provided in the method embodiment of this application.

In some embodiments, the terminal 1500 may alternatively include: a peripheral interface 1503 and at least one peripheral. The processor 1501, the memory 1502, and the peripheral interface 1503 may be connected through a bus or a signal cable. Each peripheral may be connected to the peripheral interface 1503 through a bus, a signal cable, or a circuit board. Specifically, the peripheral may include: at least one of a communication interface 1504, a display screen 1505, an audio circuit 1506, a camera component 1507, a positioning component 1508, and a power supply 1509.

A person skilled in the art may understand that the structure shown in FIG. 15 constitutes no limitation on the terminal 1500, and the terminal may include more or fewer components than those shown in the figure, or some components may be combined, or a different component deployment may be used.

Figure 16:
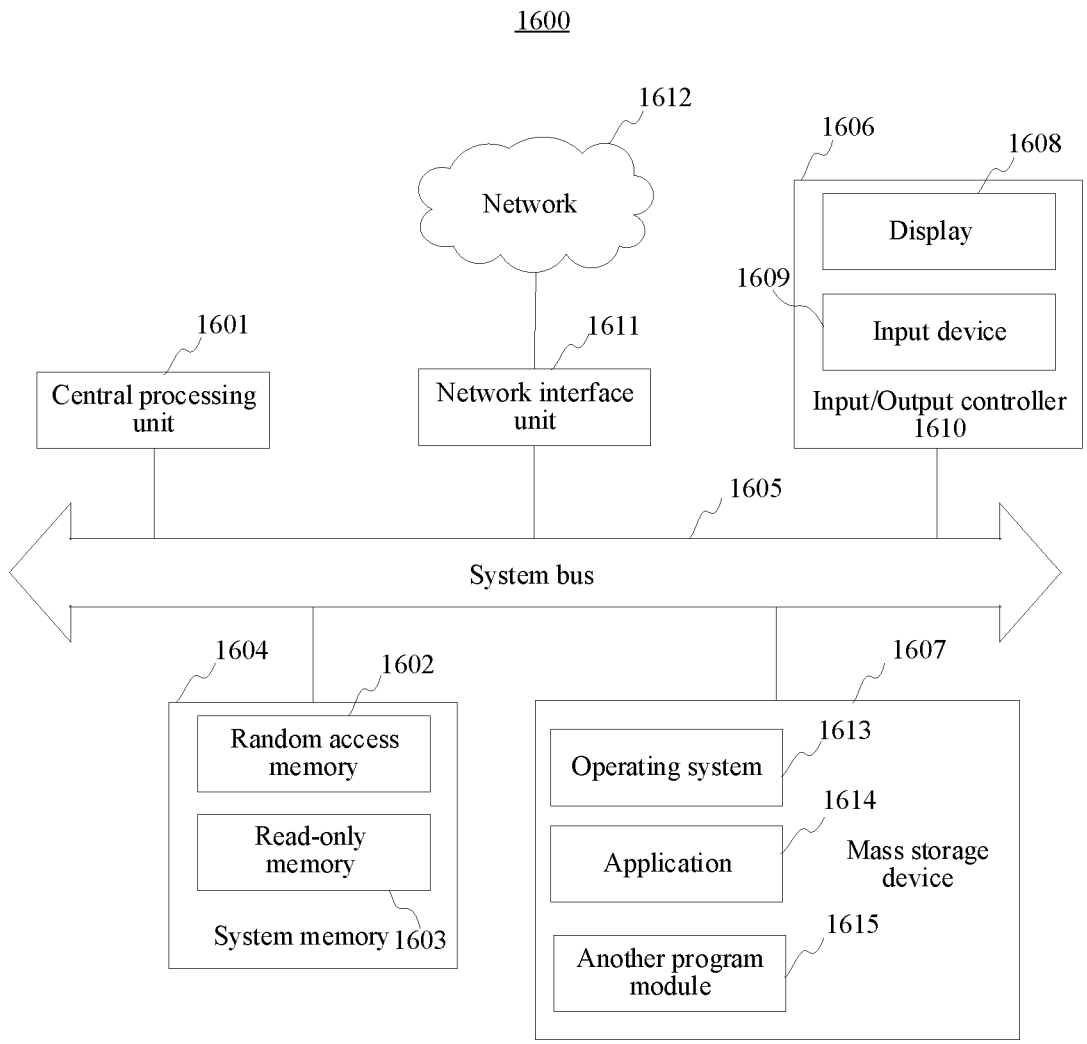
FIG. 16 is a schematic structural diagram of a server according to an embodiment of this application.

FIG. 16 is a schematic structural diagram of a server according to an embodiment of this application. Specifically:

The server 1600 includes a CPU 1601, a system memory 1604 including a RAM 1602 and a read-only memory (ROM) 1603, and a system bus 1605 connecting the system memory 1604 and the CPU 1601. The server 1600 further includes a basic input/output system (I/O system) 1606 assisting in transmitting information between devices in a computer, and a mass storage device 1607 configured to store an operating system 1613, an application 1614 and another program module 1615.

The basic I/O system 1606 includes a display 1608 configured to display information and an input device 1609 such as a mouse or a keyboard that is configured for information inputting by a user. The display 1608 and the input device 1609 are both connected to the CPU 1601 by an input/output controller 1610 connected to the system bus 1605. The basic I/O system 1606 may further include the input/output controller 1610, to receive and process inputs from a plurality of other devices, such as a keyboard, a mouse, or an electronic stylus. Similarly, the input/output controller 1610 further provides an output to a display screen, a printer, or another type of output device.

The mass storage device 1607 is connected to the CPU 1601 through a mass storage controller (not shown) connected to the system bus 1605. The mass storage device 1607 and an associated computer-readable medium provide non-volatile storage for the server 1600. That is, the mass storage device 1607 may include a non-transitory computer-readable medium (not shown) such as a hard disk or a compact disc ROM (CD-ROM) drive.

In general, the non-transitory computer-readable medium may include a computer storage medium and a communication medium. The computer-storage medium includes volatile and non-volatile media, and removable and non-removable media implemented by using any method or technology used for storing information such as computer-readable instructions, data structures, program modules, or other data. The computer storage medium includes a RAM, a ROM, an erasable programmable ROM (EPROM), a flash memory or another solid-state storage technology, a CD-ROM, a DVD or another optical storage, a magnetic cassette, a magnetic tape, or a magnetic disk storage or another magnetic storage device. Certainly, a person skilled in the art may learn that the computer storage medium is not limited to the foregoing several types. The system memory 1604 and the mass storage device 1607 may be collectively referred to as a memory.

According to various embodiments of this application, the server 1600 may further be connected, by using a network such as the Internet, to a remote computer on the network and run. That is, the server 1600 may be connected to a network 1612 by using a network interface unit 1611 connected to the system bus 1605, or may be connected to another type of network or a remote computer system (not shown) by using a network interface unit 1611.

The memory further includes at least one instruction, at least one program, a code set, or an instruction set. The at least one instruction, the at least one program, the code set, or the instruction set is stored in the memory and is configured to be executed by one or more processors to implement the foregoing virtual object control method.

In an exemplary embodiment, a computer device is further provided. The computer device may be a terminal or a server. The computer device includes a processor and a memory, the memory storing at least one instruction, at least one program, a code set, or an instruction set, the at least one instruction, the at least one program, the code set, or the instruction set being loaded and executed by the processor to implement the foregoing virtual object control method.

In an exemplary embodiment, a non-transitory computer-readable storage medium is further provided, storing at least one instruction, at least one program, a code set, or an instruction set, the at least one instruction, the at least one program, the code set, or the instruction set, when executed by a processor, implementing the foregoing virtual object control method.

In an exemplary embodiment, a computer program product is further provided, the computer program product, when executed by a processor, being used for implementing the foregoing virtual object control method.

It is to be understood that "plurality of" mentioned in this specification means two or more. "And/or" describes an association relationship for associated objects and represents that three relationships may exist. For example, A and/or B may represent the following three cases: only A exists, both A and B exist, and only B exists. The character "/" generally indicates an "or" relationship between the associated objects.

The foregoing descriptions are merely exemplary embodiments of this application, but are not intended to limit this application. Any modification, equivalent replacement, or improvement made within the spirit and principle of this application shall fall within the protection scope of this application.

What is claimed is:

1. A virtual object control method, performed by a computer device, the method comprising:
   displaying a virtual battle interface including a first virtual scene, the virtual battle interface comprising n virtual objects and a function triggering control in the first virtual scene, the function triggering control being configured to trigger an attack function against one of the virtual objects, n being a positive integer;
   receiving a first trigger operation on the function triggering control in the first virtual scene;
   determining a first virtual object in the n virtual objects as an attack target in the first virtual scene based on operation information of the first trigger operation when the first trigger operation meets an activation condition, the operation information being information obtained based on an activated target aiming function associated with the function triggering control, the target aiming function being used for selecting an attack virtual target for the attack function; and
   changing the first virtual scene to a second virtual scene, the second virtual scene including the functioning triggering control, the first virtual object, and at least another virtual object, wherein the first virtual object remains as the attack target before a second trigger operation is performed on the functioning triggering control.

2. The method according to claim 1, wherein the determining a first virtual object in the n virtual objects as an attack target based on operation information of the first trigger operation comprises:
   displaying a target selection region in the virtual battle interface based on direction information of the first trigger operation on the function triggering control, the direction information being a direction of a real-time touch point of the first trigger operation relative to a center point of the function triggering control and the target selection region including the first virtual object; and
   determining the first virtual object within the target selection region as the attack target when the first trigger operation ends.

3. The method according to claim 2, wherein
   a relative direction between a center point of the target selection region and the position of the target virtual object corresponds to the direction information, and a distance between the center point of the target selection region and the position of the target virtual object corresponds to a distance between the real-time touch point and the center point of the function triggering control.

4. The method according to claim 1, wherein the function triggering control comprises an activation region and an aiming region; and
the determining a first virtual object in the n virtual objects as an attack target based on operation information of the first trigger operation when the first trigger operation meets an activation condition comprises:
determining the first virtual object as the attack target based on the operation information of the first trigger operation when an operation position of the first trigger operation is moved from the activation region to the aiming region.

5. The method according to claim 1, further comprising:
after displaying the virtual battle interface:
determining m candidate virtual objects meeting a selection condition from the n virtual objects, m being a positive integer, and m≤n;
displaying identifiers of the m candidate virtual objects;
receiving a selection signal for an identifier of a second virtual object in the m candidate virtual objects; and
determining the second virtual object as the attack target.

6. The method according to claim 1, further comprising:
determining that the first virtual object is in a lost state when the first virtual object meets a loss condition, the loss condition comprising at least one of the following: the first virtual object being in a death state, the first virtual object being not in the virtual battle interface, and a distance between the first virtual object and the target virtual object being greater than a preset distance; and
keeping the first virtual object as the attack target when no other virtual object is determined as the attack target within a preset target duration in which the first virtual object is in the lost state.

7. The method according to claim 1, further comprising:
after determining the first virtual object in the n virtual objects as the attack target, casting a skill to the attack target when a trigger operation corresponding to a skill casting control is received.

8. The method according to claim 7, wherein the casting a skill to the attack target when a trigger operation corresponding to a skill casting control is received comprises:
obtaining skill attribute information corresponding to the skill casting control when the trigger operation corresponding to the skill casting control is received, the skill attribute information comprising a skill casting rule; and
casting a skill to the attack target when the attack target meets the skill casting rule.

9. The method according to claim 8, further comprising:
determining, when the attack target does not meet the skill casting rule, a second virtual object in the n virtual objects that meets both a selection condition and the skill casting rule as the attack target.

10. The method according to claim 1, further comprising:
after determining the first virtual object in the n virtual objects as the attack target, displaying, in the virtual battle interface, an association identifier used for indicating an association relationship between the identifier of the first virtual object and the first virtual object.

11. A computer device, comprising a processor and a memory, the memory storing at least one program, the at least one program, being loaded and executed by the processor to perform a plurality of operations including:
displaying a virtual battle interface including a first virtual scene, the virtual battle interface comprising n virtual objects and a function triggering control in the first virtual scene, the function triggering control being configured to trigger an attack function against one of the virtual objects, n being a positive integer;
receiving a first trigger operation on the function triggering control in the first virtual scene;
determining a first virtual object in the n virtual objects as an attack target in the first virtual scene based on operation information of the first trigger operation when the first trigger operation meets an activation condition, the operation information being information obtained based on an activated target aiming function associated with the function triggering control, the target aiming function being used for selecting an attack virtual target for the attack function; and
changing the first virtual scene to a second virtual scene, the second virtual scene including the functioning triggering control, the first virtual object, and at least another virtual object, wherein the first virtual object remains as the attack target before a second trigger operation is performed on the functioning triggering control.

12. The computer device according to claim 11, wherein the determining a first virtual object in the n virtual objects as an attack target based on operation information of the first trigger operation comprises:
displaying a target selection region in the virtual battle interface based on direction information of the first trigger operation on the function triggering control, the direction information being a direction of a real-time touch point of the first trigger operation relative to a center point of the function triggering control and the target selection region including the first virtual object; and
determining the first virtual object within the target selection region as the attack target when the first trigger operation ends.

13. The computer device according to claim 11, wherein the function triggering control comprises an activation region and an aiming region; and
the determining a first virtual object in the n virtual objects as an attack target based on operation information of the first trigger operation when the first trigger operation meets an activation condition comprises:
determining the first virtual object as the attack target based on the operation information of the first trigger operation when an operation position of the first trigger operation is moved from the activation region to the aiming region.

14. The computer device according to claim 11, wherein the plurality of operations further comprise:
after displaying the virtual battle interface:
determining m candidate virtual objects meeting a selection condition from the n virtual objects, m being a positive integer, and m≤n;
displaying identifiers of the m candidate virtual objects;
receiving a selection signal for an identifier of a second virtual object in the m candidate virtual objects; and
determining the second virtual object as the attack target.

15. The computer device according to claim 11, wherein the plurality of operations further comprise:
- determining that the first virtual object is in a lost state when the first virtual object meets a loss condition, the loss condition comprising at least one of the following: the first virtual object being in a death state, the first virtual object being not in the virtual battle interface, and a distance between the first virtual object and the target virtual object being greater than a preset distance; and
- keeping the first virtual object as the attack target when no other virtual object is determined as the attack target within a preset target duration in which the first virtual object is in the lost state.

16. The computer device according to claim 11, wherein the plurality of operations further comprise:
- after determining the first virtual object in the n virtual objects as the attack target, displaying, in the virtual battle interface, an association identifier used for indicating an association relationship between the identifier of the first virtual object and the first virtual object.

17. A non-transitory computer-readable storage medium, storing at least one program, the at least one program being loaded and executed by a processor of a computer device to perform a plurality of operations including:
- displaying a virtual battle interface including a first virtual scene, the virtual battle interface comprising n virtual objects and a function triggering control in the first virtual scene, the function triggering control being configured to trigger an attack function against one of the virtual objects, n being a positive integer;
- receiving a first trigger operation on the function triggering control in the first virtual scene;
- determining a first virtual object in the n virtual objects as an attack target in the first virtual scene based on operation information of the first trigger operation when the first trigger operation meets an activation condition, the operation information being information obtained based on an activated target aiming function associated with the function triggering control, the target aiming function being used for selecting an attack virtual target for the attack function; and
- changing the first virtual scene to a second virtual scene, the second virtual scene including the functioning triggering control, the first virtual object, and at least another virtual object, wherein the first virtual object remains as the attack target before a second trigger operation is performed on the functioning triggering control.

18. The non-transitory computer-readable storage medium according to claim 17, wherein the determining a first virtual object in the n virtual objects as an attack target based on operation information of the first trigger operation comprises:
- displaying a target selection region in the virtual battle interface based on direction information of the first trigger operation on the function triggering control, the direction information being a direction of a real-time touch point of the first trigger operation relative to a center point of the function triggering control and the target selection region including the first virtual object; and
- determining the first virtual object within the target selection region as the attack target when the first trigger operation ends.

19. The non-transitory computer-readable storage medium according to claim 17, wherein the function triggering control comprises an activation region and an aiming region; and
- the determining a first virtual object in the n virtual objects as an attack target based on operation information of the first trigger operation when the first trigger operation meets an activation condition comprises:
    - determining the first virtual object as the attack target based on the operation information of the first trigger operation when an operation position of the first trigger operation is moved from the activation region to the aiming region.

20. The non-transitory computer-readable storage medium according to claim 17, wherein the plurality of operations further comprise:
- after determining the first virtual object in the n virtual objects as the attack target, displaying, in the virtual battle interface, an association identifier used for indicating an association relationship between the identifier of the first virtual object and the first virtual object.

* * * * *